United States Patent
Brase et al.

(10) Patent No.: US 7,297,060 B2
(45) Date of Patent: Nov. 20, 2007

(54) TRANSPORTABLE APPARATUS FOR A GAME SYSTEM

(75) Inventors: Kevin Brase, Corinth, TX (US); Michael Hammond, Madison, WI (US)

(73) Assignee: Mattel, Inc., El Segundo, CA (US)

( * ) Notice: Subject to any disclaimer, the term of this patent is extended or adjusted under 35 U.S.C. 154(b) by 256 days.

(21) Appl. No.: 10/843,920

(22) Filed: May 12, 2004

(65) Prior Publication Data

US 2005/0255925 A1  Nov. 17, 2005

(51) Int. Cl.
*A63F 9/24* (2006.01)
(52) U.S. Cl. .................................. 463/36; 273/148 B
(58) Field of Classification Search .......... 463/36–37, 463/47; 273/148 R, 148 B, 309; 297/217.3, 297/217.4, 377, 188.04, 188.07
See application file for complete search history.

(56) References Cited

U.S. PATENT DOCUMENTS

| 5,042,874 | A | * | 8/1991 | Williams ..................... 297/17 |
| 5,054,771 | A | | 10/1991 | Mansfield |
| 5,195,746 | A | | 3/1993 | Boyd et al. |
| 5,290,034 | A | | 3/1994 | Hineman |
| 5,437,453 | A | | 8/1995 | Hineman |
| 5,882,079 | A | * | 3/1999 | Yang ........................... 297/377 |
| 5,911,634 | A | | 6/1999 | Nidata et al. |
| 6,033,014 | A | | 3/2000 | Nightengale |
| 6,044,772 | A | | 4/2000 | Gaudette et al. |
| 6,075,868 | A | * | 6/2000 | Goldfarb et al. ............ 381/301 |
| 6,083,106 | A | * | 7/2000 | McDowell .................... 463/46 |
| 6,283,546 | B1 | | 9/2001 | Hill |
| 6,568,334 | B1 | | 5/2003 | Gaudette et al. |
| 6,663,058 | B1 | | 12/2003 | Peterson et al. |
| 6,776,104 | B2 | * | 8/2004 | Herbst ......................... 108/25 |
| 2003/0171190 | A1 | | 9/2003 | Rice |
| 2005/0159219 | A1 | * | 7/2005 | Oswald ....................... 463/36 |
| 2005/0282632 | A1 | * | 12/2005 | James-Herbert ............. 463/36 |

FOREIGN PATENT DOCUMENTS

| GB | 2329829 | | 7/1999 |
| GB | 2406504 A | * | 4/2005 |
| JP | 11-179051 | | 7/1999 |
| WO | 9930789 | | 6/1999 |
| WO | WO 2005/105246 A1 | | 11/2005 |

OTHER PUBLICATIONS www.game-revolution.com/games/hardware/intensor.htm, printed on Jan. 6, 2004.

* cited by examiner

*Primary Examiner*—Robert E. Pezzuto
*Assistant Examiner*—Alex F. R. P. Rada, II
(74) *Attorney, Agent, or Firm*—Bell, Boyd & Lloyd LLP

(57) ABSTRACT

A transportable apparatus for a video game system where the apparatus includes a frame and a seat foldably connected to the frame such that the frame is movable between a storage position adjacent to the seat and an operative position away from the seat. The apparatus also includes an interface associated with one of the frame and the seat for providing user input to the video game system. The transportable apparatus is configured to be easily folded and unfolded and enables users to transport the apparatus to different locations.

27 Claims, 8 Drawing Sheets

TRANSPORTABLE APPARATUS FOR A GAME SYSTEM

BACKGROUND OF THE INVENTION

Video game systems use several different types of controllers to control an input or other display in a video game. The video game players use the video game controllers to control and to manipulate different functions or operations in the video games. The video game controllers typically include different controls or input devices such as buttons, triggers or joysticks to control these operations.

Certain video game systems also employ other types of controllers for video games which enhance the operation and play of the video games. For example, certain video game accessories or controllers include guns for shooting simulated targets. Several other accessories are available for these games. These accessories provide more realistic control of the video games and enhance the video game playing experience for the players.

Accordingly, there is a need for video game accessories which enhance the realism of the game play as well as the excitement and enjoyment of the video game for the players.

SUMMARY OF THE INVENTION

The present invention is directed to an apparatus for a game system and more specifically, to a transportable apparatus for a video game system.

In an embodiment, the transportable apparatus includes a frame and a seat foldably connected to the frame such that the frame is movable between a storage position adjacent to the seat and an operative position away from the seat. The apparatus includes an interface associated with one of the frame and the seat for providing user input to the video game system. The transportable apparatus is configured to be easily folded and unfolded and enables users to transport the apparatus to different locations.

In an embodiment, the seat includes a base and a rear member movably connected to the base, where the rear member is movable to several different positions.

In another embodiment, a support is hingedly connected to the rear member to provide added stability to the rear member of the seat. In a further embodiment, the transportable apparatus includes a support strap positioned between the support and the rear member where the support strap is connected to the support and the rear member. The support strap prevents the support from moving beyond a designated distance from the rear member.

In an embodiment, the interface includes at least one of a steering wheel and a pedal. In one aspect of this embodiment, the pedal includes at least one of an accelerator pedal and a brake pedal. It should be appreciated that the interface may be any suitable interface or control to control the operation of a simulated image such as a simulated vehicle displayed on a display device associated with the video game system. It should also be appreciated that the transportable apparatus of the present invention may be used to control any suitable simulated image such as a simulated vehicle, simulated airplane, simulated helicopter, simulated motorcycle, simulated boat or any other suitable simulated image associated with a game operated by a game system or video game system.

In an embodiment, the transportable apparatus includes a communication member adapted to be in communication with the interface. In one aspect of this embodiment, the communication member includes at least one cable such as an electrical cable. In another aspect of this embodiment, the communication member includes a wireless communication device.

In another embodiment, the transportable apparatus includes a first frame member and a second frame member hingedly connected to the first frame member, where the first frame member and the second frame member are movable between a storage position and an operative position. The transportable apparatus also includes a seat foldably connected to the first frame member where the seat includes a base and a rear member hingedly connected to the base. The rear member is movable towards and away from the base to a plurality of different positions. The transportable apparatus also includes a steering wheel removably connected to the first frame member and a plurality of pedals each movably connected to the second frame member. A communication device is associated with one of the frame and the seat and provides user input to the video game system. When the first frame member, the second frame member and the seat are in the operative position, the first frame member and the second frame member are movable to enable a user such as a player to move the second frame member towards the first frame member and move the first frame member to a position adjacent to the seat to place the apparatus in the storage position. In the storage position, the transportable apparatus is transportable to one or more different locations.

In an embodiment, the first frame member includes at least two telescoping members connected in a sliding relationship with each other where the telescoping members are slidable or movable to a plurality of different positions. The positions of the telescoping member is determined by the size and comfort preferences of the player. In an embodiment, the transportable apparatus includes a lock attached to at least one of the telescoping members to hold the telescoping members in a desired position.

Similarly, the second frame member includes at least two telescoping members connected in a sliding relationship, where the telescoping members are slidable to a plurality of different positions. In an embodiment, the transportable apparatus includes a lock attached to at least one of the telescoping members to hold the telescoping members in a desired position.

In an embodiment, the transportable apparatus includes a frame including a first member and a second member hingedly connected to the first member. The transportable apparatus also includes a seat foldably connected to the frame, where the seat includes a base and a rear member hingedly connected to the base. The rear member is movable to a plurality of different positions. The transportable apparatus also includes a container attached to the seat for holding the steering wheel during transportation of the transportable apparatus. A support is hingedly connected to the rear member to further support the rear member. The transportable apparatus includes a steering wheel removably connected to the frame and at least one pedal movably connected to the frame. A connector is connected to the frame and is in communication with the steering wheel and the pedal to communicate the signals from these components to the video game system.

In an embodiment, to place the apparatus in storage for transportation or otherwise, the steering wheel is removed and placed in the container such as a pocket. The second member is moved to a position adjacent to the first member and the first member is moved to a position adjacent to the base. The first member, second member and base are moved to a position adjacent to the rear member and the support is moved about the seat to a position adjacent to the second member so that the rear member and the support enclose the first member, the second member and the base. In one embodiment, the transportable apparatus includes a handle connected to at least one of the rear member and the support to enable a player to be able to easily carry or transport the transportable apparatus.

In another embodiment, a method for storing and transporting a transportable apparatus for a video game system to different locations is provided where the transportable apparatus includes a frame having a first member and a second member hingedly connected to the first member. The transportable apparatus also includes a seat foldably connected to the frame, where the seat includes a base and a rear member hingedly connected to the base. A container is attached to the seat to enable a player to store the steering wheel during storage or transport of the transportable apparatus. Additionally, a support is hingedly connected to the rear member to further support the back of the seat for a player. The transportable apparatus also includes a steering wheel removably connected to the frame and at least one pedal movably connected to the frame. A connector is connected to the frame and is in communication with the steering wheel and the pedal to communicate signals to the video game system.

The method includes the steps of removing the steering wheel, placing the steering wheel in the container such as a pocket, moving the second member to a position adjacent to the first member, moving the first member to a position adjacent to the base of the seat and moving the first member, second member and base to a position adjacent to the rear member of the seat. The next step includes moving the support about the seat to a position adjacent to the second member so that the rear member and the support enclose the first member, the second member and the base. The next steps include transporting the transportable apparatus to a different location and moving the support, the base, the first member and the second member each to a desired operative position. Next, the player removes the steering wheel from the container and connects the steering wheel to the first member.

The transportable apparatus enhances players playing experience by enabling players to play or operate a transportable game displayed by a game system such as a video game system with more control and realism. Additionally, the transportable apparatus of the present invention can be easily and quickly folded into a easily transportable package or pack to carry the transportable apparatus from one location to the next.

It is therefore an advantage of the present invention to provide an transportable apparatus for a game system which is foldable to enable a player to transport the apparatus to different locations.

Additional features and advantages of the present invention are described in, and will be apparent from, the following Detailed Description of the Invention and the figures.

DETAILED DESCRIPTION OF THE INVENTION

The present invention generally refers to an apparatus for a video game system and more specifically, to a transportable apparatus for a video game system.

Referring now to FIGS. 1 to 7B, the transportable apparatus of the present invention is generally indicated as numeral 10. The transportable apparatus 10 is an accessory or additional controller for use with a game system such as a video game system to enhance a player's experience with a game operated by the video game system and, more specifically, for a transportable game played or operated on that video game system. The transportable apparatus 10 is a portable apparatus or device which can be transported by a player to several different locations such as from the player's house to a friend's house. The transportable apparatus 10 generally includes a player support or seat 12 which is foldably connected to a frame 14. A pedal base or front base 16 is connected to the opposite end of the frame 14. An interface such as position controller or steering wheel 18 is removably attached to the frame and is operable to change the lateral positioning of a simulated image such as a simulated vehicle or car on a display device associated with a video game system. Additionally, at least one and preferably two additional interfaces such as pedals 60 are movably attached to the pedal base 16. In one embodiment, one of the pedals is a gas pedal or accelerator pedal and the other pedal is a brake pedal.

Figures 2A, 2B:
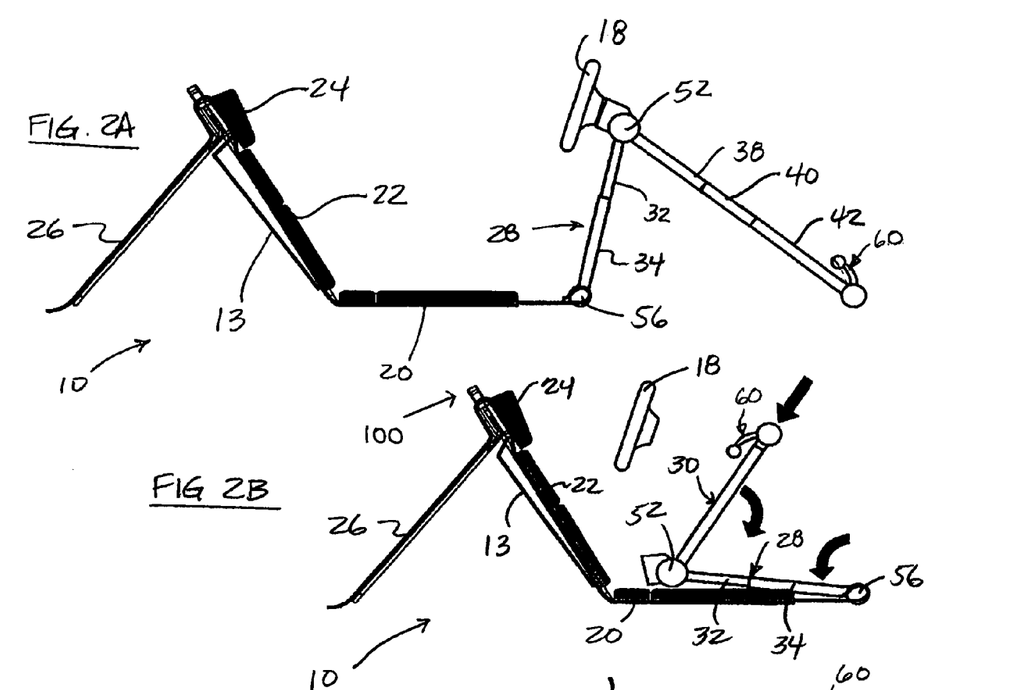
FIG. 2A is an elevation view of the apparatus of FIG. 1 illustrating the apparatus in an operative position.
FIG. 2B is an elevation view of the race package of FIG. 1 illustrating the frame of the apparatus being folded towards the seat.
Figure 2C:
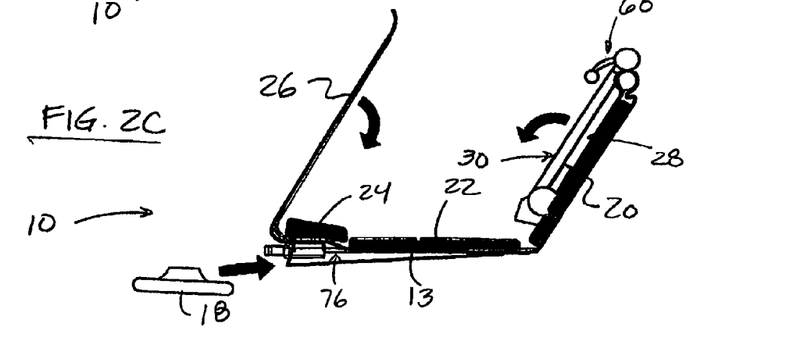
FIG. 2C is an elevation view of the race package of FIG. 1 illustrating the frame of the apparatus being folded adjacent to the seat, the support being folded onto the frame and the steering wheel being stored in the container.
Figure 2D:
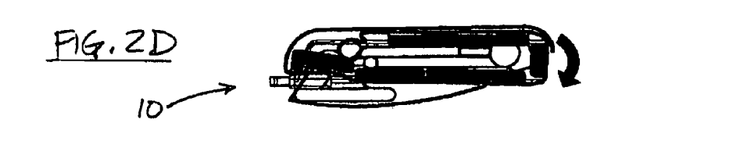
FIG. 2D is an elevation view of the apparatus of FIG. 1 illustrating the apparatus in a storage position.

Referring to FIGS. 2A to 2D, initially, the transportable apparatus 10 is sold or displayed in a closed or storage position as best seen in FIG. 2D, where the transportable apparatus 10 can be easily transported from the store to a player's house or to other locations. The transportable apparatus 10 is then unfolded and adjusted to adapt to the size of the player using the apparatus. Once the transportable apparatus 10 is unfolded and adjusted to the size of the player, the player connects the transportable apparatus to the video game system using a communication device such as a cord, cable or electrical cable 74. The cord or cable 74 communicates the signals delivered from the steering wheel and/or one or more of the pedals to the video game system so that the video game system can simulate the player's inputs using the steering wheel and the pedals in the game operated by the video game system. Alternatively, a wireless communication device When a player is finished using the transportable apparatus 10 and desires to either store the transportable apparatus in a storage closet or other location or desires to transport the transportable apparatus to another location such as a friend's house, the transportable apparatus can be folded up easily and quickly. In one embodiment, as is further explained in more detail below, the frame 14 folds towards and onto the bottom of the seat 12 as seen in FIG. 2B. The rear member or back portion of the seat 12 is then folded onto the top of the frame and pedal base. The support 26 of the seat 12 is rotated about the top of the seat until the support 26 is on top of the frame 14 as seen in FIG. 2C. The steering wheel 18 is placed in the container or pocket 76. The top ends of the seat can then be secured together using velcro or a similar fastener to secure the transportable apparatus 10 in a compact package or carrying pack as shown in FIG. 2D. The transportable apparatus 10 can now be transported to another location easily and then set up at that location very quickly by unfolded the transportable apparatus as described above.

Figure 1:
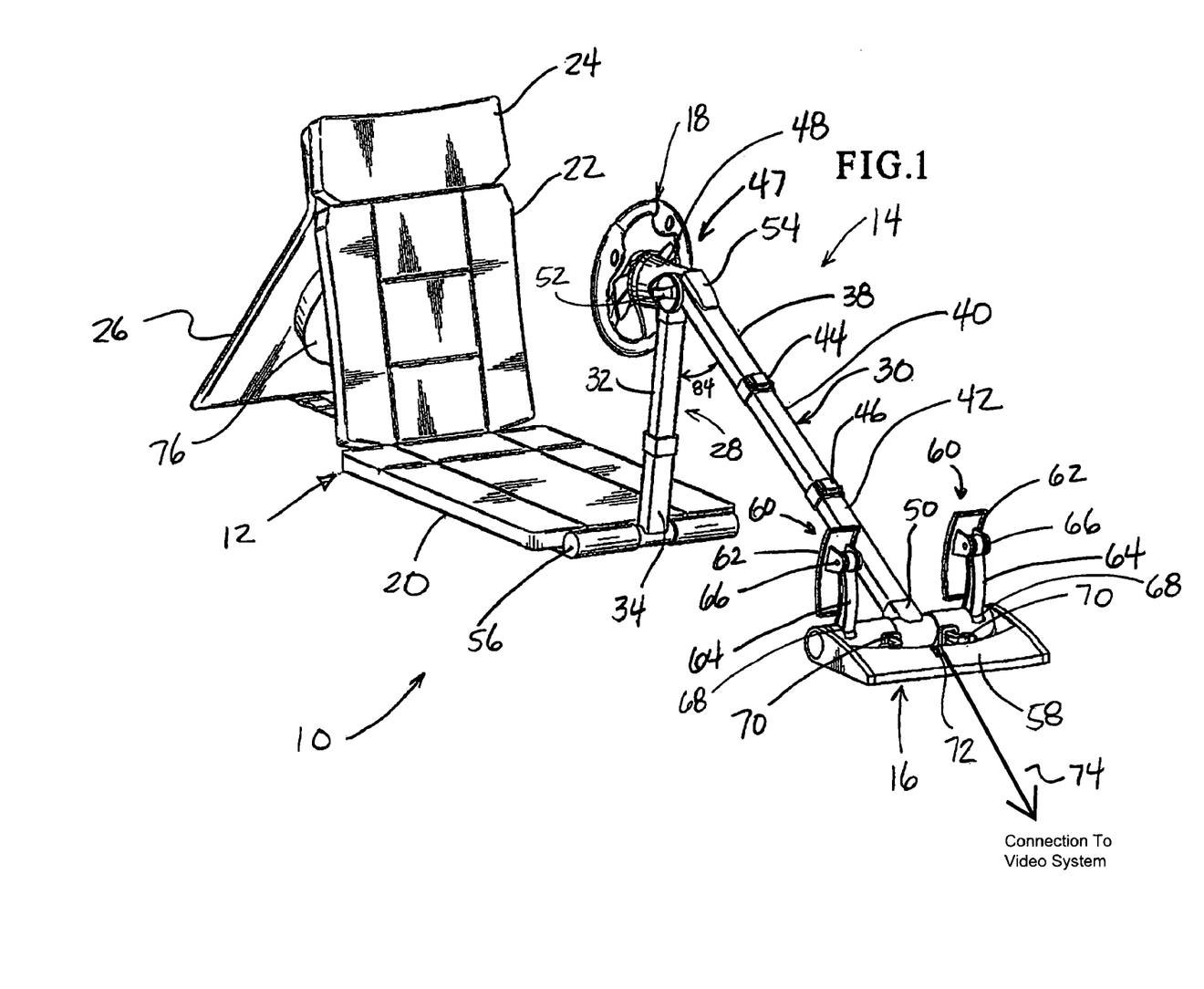
FIG. 1 is a front perspective view of one embodiment of the apparatus of the present invention.
Figure 3:
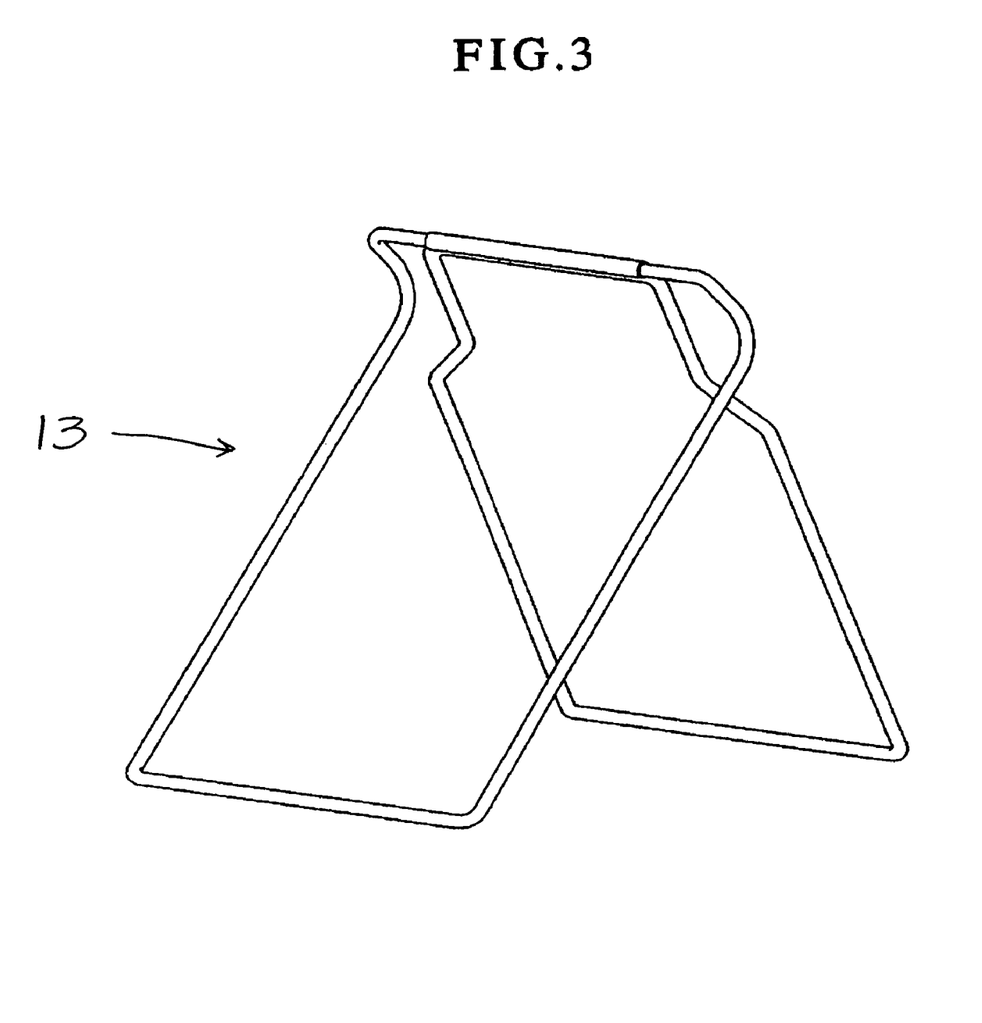
FIG. 3 is a perspective view of the seat frame of the race package of FIG. 1.

In one embodiment, the seat 12 of the transportable apparatus 10 includes a seat base 20, a rear member or back support 22, which is movably connected to one end of the seat base 20, a head rest 24, which is integrally formed with or connected to the rear member 22 and the seat support 26, which is hingedly connected to the top of the rear member 22 to enable the seat support to be able to be pivoted or rotated about the top of the rear member 22. The seat base 20, the rear member 22, the head rest 24 and the seat support 26 form a seat cover which covers a seat frame or frame 13. The cover material includes any suitable material such as a canvas or nylon material, which makes the seat 12 more comfortable. It should be appreciated that the cover material may be any suitable material. Additionally, it should be appreciated that the material may be any color or configuration as desired by the manufacturer. In one embodiment, a padding or padding-like material is inserted between the cover material and the components of the seat to provide additional cushion or support to enhance the player's comfort level while sitting in the seat.

The seat support 26 is hingedly attached or connected to the rear member 22. The seat support 26 can be pivoted to adjust the recline angle of the rear member 22 to adjust to different comfort preferences of a player. The seat support 26 is connected to the rear member so that the angle of the seat support 26 enables the seat support to remain stationary while the player is playing a game using the transportable apparatus 10. In one embodiment, a position lock such as strap 78 is attached between the support 26 and rear member 22 to prevent the seat support from moving further away from the rear member. The seat 12 is movably or rotatably connected to a horizontal support or bar 56 as shown in the illustrated embodiment. The support bar 56 is connected to frame 14.

Figure 6:
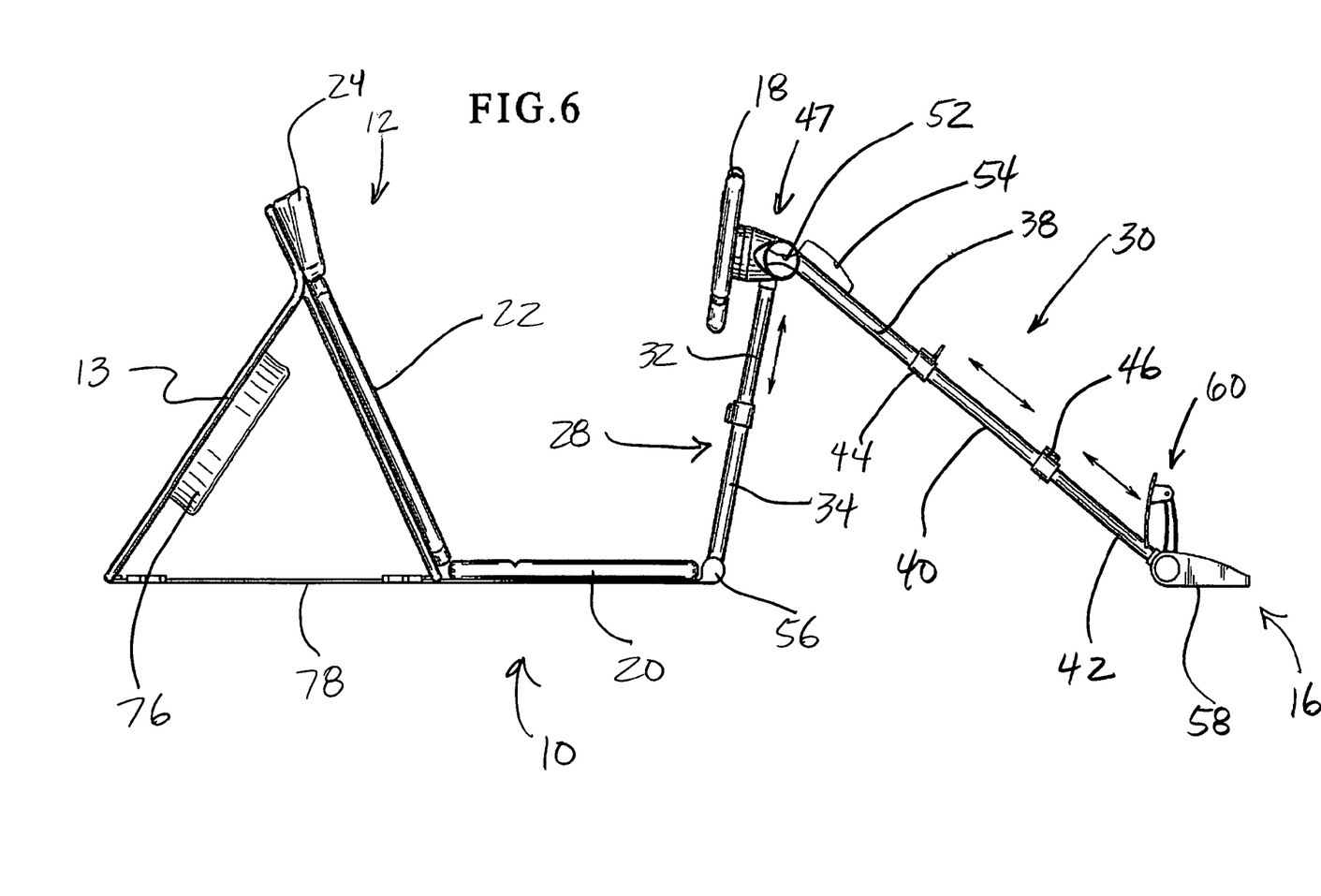
FIG. 6 is a perspective view of the race package of FIG. 1 illustrating the first and second members of the frame.

In the illustrated embodiment, the frame 14 includes a first frame support 28 and a second frame support 30, which is hingedly connected to the first frame support. The first frame support 28 and the second frame support 30 can therefore pivot towards or away from each other to adjust the position of the pedal base 16 and also adjust the height or placement of the position control or steering wheel 18. In one embodiment, the first frame support 28 includes an upper member 32 and a lower member 34, which is slidingly engaged with or connected to the upper member. Generally, the upper member 32 and the lower member 34 are shaped and sized so that the upper member 32 fits within or slides within the lower member 34. The upper member 32 can be moved into or out of the lower member 34 to adjust the length or height of the first frame support 28. Adjusting the length or height of the first frame support 28 enables the user to adjust the height or position of the steering wheel 18. A locking member or lock 36 is attached to the upper end of the lower member and includes a lever which causes the lock 36 to compress or expand when the lever is pushed inward or pulled outward, respectively. When the lever is pushed inward or toward the first frame support 28, the tension or compression of the lock 36 on the upper member and lower member causes the upper member 32 to be locked or held in position or place. This prevents the upper member from accidentally or inadvertently moving upward or downward within the lower member during operation of the transportable apparatus. The lock or locking member 36 may be any suitable tensioning device.

A second frame support 30 includes three sections: a top member 38, a middle member 40 and a bottom member 42. The top member 38, the middle member 40 and the bottom member 42 are sized and shaped so that the middle member 40 fits within or slides within the bottom member 42 and is held in position by the locking device or lock 46. The locking device or lock operates or functions in the same manner as the lock 36 described above. Similarly, the upper member or top member 38 fits within or slides within the middle member 40. A locking device or lock 44 is positioned between the middle member and the top member to hold the top member in place as described above. To adjust the length of the second frame support 30, the top member 38 and/or the middle member 40 may be adjusted accordingly. The top member 38 may be moved into or out of the middle member 40 to increase or decrease the length of the second frame support 30. Alternatively or in addition to the movement of the top member 38, the middle member 40 may be moved into or out of the bottom member 42 to further adjust the length of the second frame support 30. Once the top member and/or the middle member are positioned in a desired position by the player, the levers on the locks 44 and 46 are pressed inward or pushed towards the second frame support 30 to lock the top member 38 and the middle member 40 in place. The locks prevent the top member and middle member from sliding and moving out of position during operation of the transportable apparatus 10.

Figure 4A:
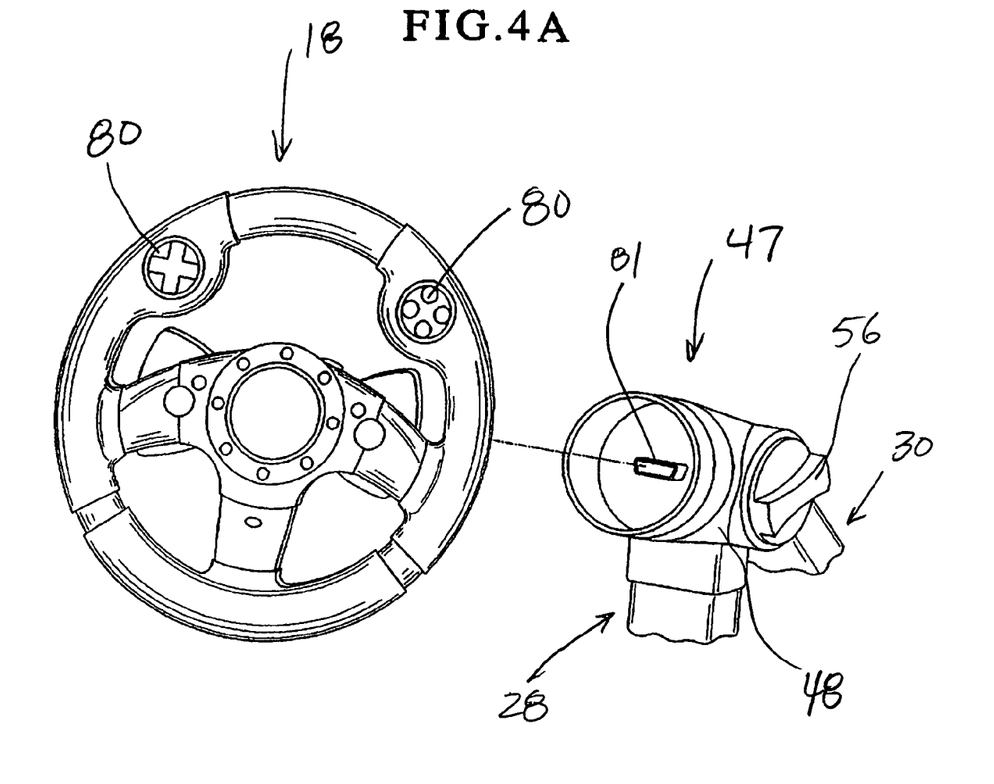
FIG. 4A is an enlarged exploded view of the race package of FIG. 1 illustrating the steering wheel and the steering wheel connector of the front portion of the race package.

In the illustrated embodiment, a frame connector 47 connects the first frame support 28 and the second frame support 30. Specifically, the frame connector 47 hingedly connects the first frame support to the second frame support so that the first frame support and the second frame support may pivot or move towards and away from each other to adjust the height and/or position of the steering wheel and adjust the length or distance of the pedal base from the seat. These adjustments are made to accommodate the different sizes of different players that use the transportable apparatus. The frame connector 47 includes a position control connector or steering wheel connector 48 including lock lever 82, a controller or output connector 54 and an adjustable lock 52. The frame connector 47 includes extenders or arms (not shown) which securely attach to or fit into one end of the first frame support 38 and one end of the second frame support 30 as illustrated. Once the first frame support 28 and the second frame support 30 are in a desired position, the player tightens or turns the adjustable lock 52 clockwise to press the sides of the frame connector 47 against each of the sides of the ends of the first frame support 28 and the second frame support 30 to hold or secure the first frame support and the second frame support in position at a designated angle 84 as seen in FIG. 1. The player then turns the lock 52 counterclockwise to loosen or lessen tension on the first frame support and the second frame support so that the positions of the first frame support and second frame support can be adjusted.

Figure 4B:
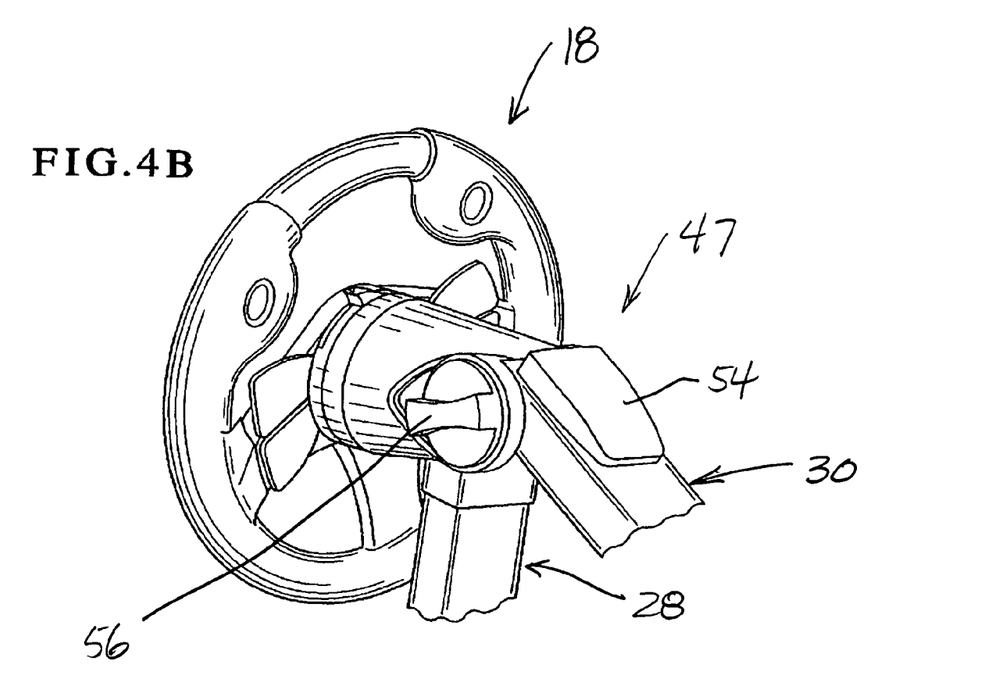
FIG. 4B is an enlarged perspective view of the race package of FIG. 1 illustrating the steering wheel in an unlocked position on the frame.
Figure 4C:
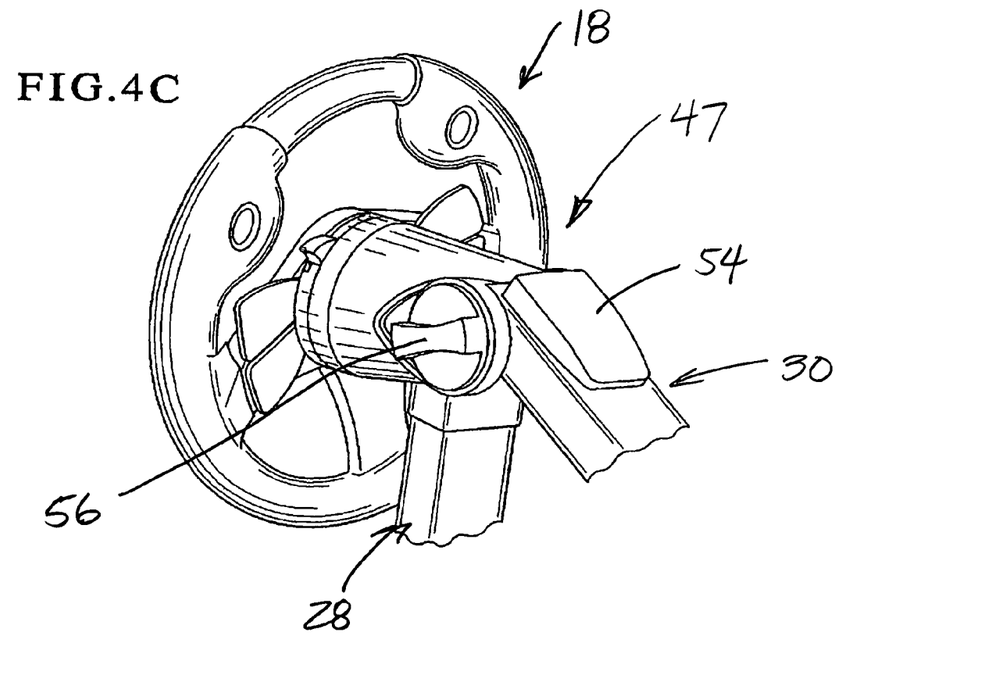
FIG. 4C is an enlarged perspective view of the race package of FIG. 1 illustrating the steering wheel in a locked position on the frame.

In the illustrated embodiment, the steering wheel connector 48 is a generally circular connector which includes a receptacle having a post or extender 81 that receives the steering wheel 18. The steering wheel 18 is matingly engaged with the steering wheel connector 48 and the lock lever or lock arm 82 is moved to an opposite position to lock or secure the steering wheel to the steering wheel connector 48. Moving the lever 82 in the opposite direction releases the steering wheel so that it can be removed for storage. When the steering wheel is connected to the steering wheel connector 48, the steering wheel is rotatable in the clockwise or counterclockwise direction to enable a player to simulate the steering of a vehicle such as a car displayed on a screen associated with the video game system. It should be appreciated that the lock mechanism of the steering wheel connector 48 may be any suitable lock or locking mechanism which will enable the steering wheel to be removably and rotatably connected to the steering wheel connector and prevent the steering wheel from being removed during operation or use of the transportable apparatus 10.

Figure 7A:
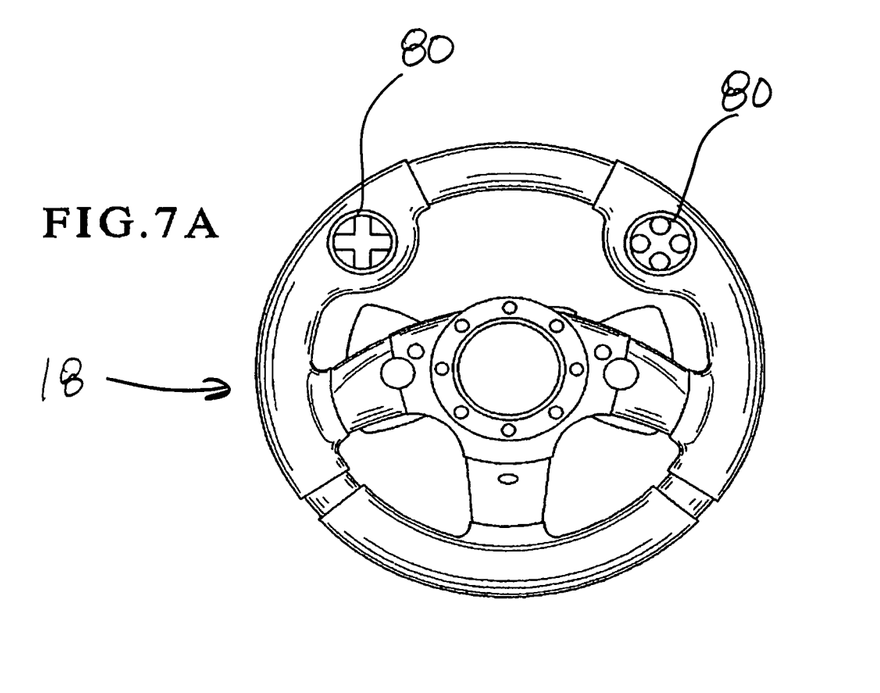
FIG. 7A is an enlarged elevation view of one embodiment of the steering wheel of the race package of FIG. 1.
Figure 7B:
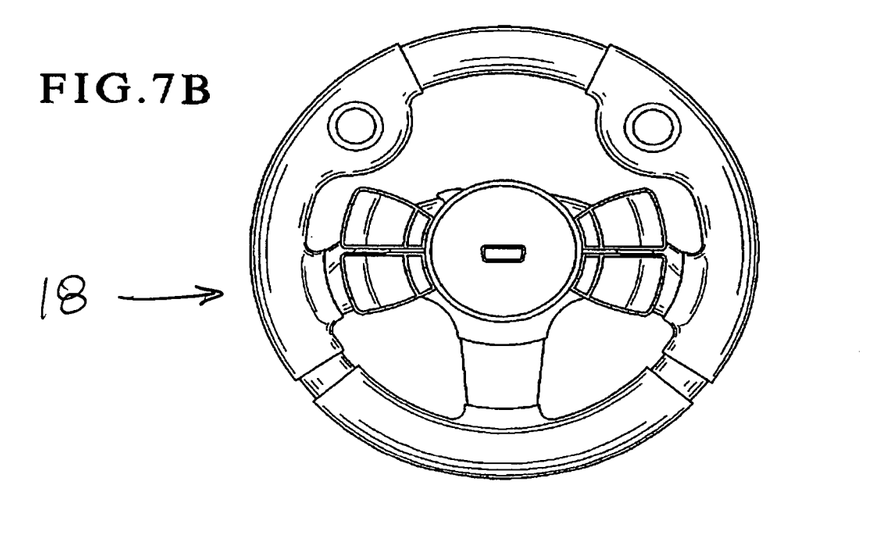
FIG. 7B is an enlarged elevation view of another embodiment of the steering wheel of the race package of FIG. 1.

In one embodiment, the steering wheel includes inputs such as inputs 80 that enable a player to communicate with the game system to perform other functions such as starting a game, ending a game, saving a game, selecting the number of player or any other suitable game functions.

Figure 5:
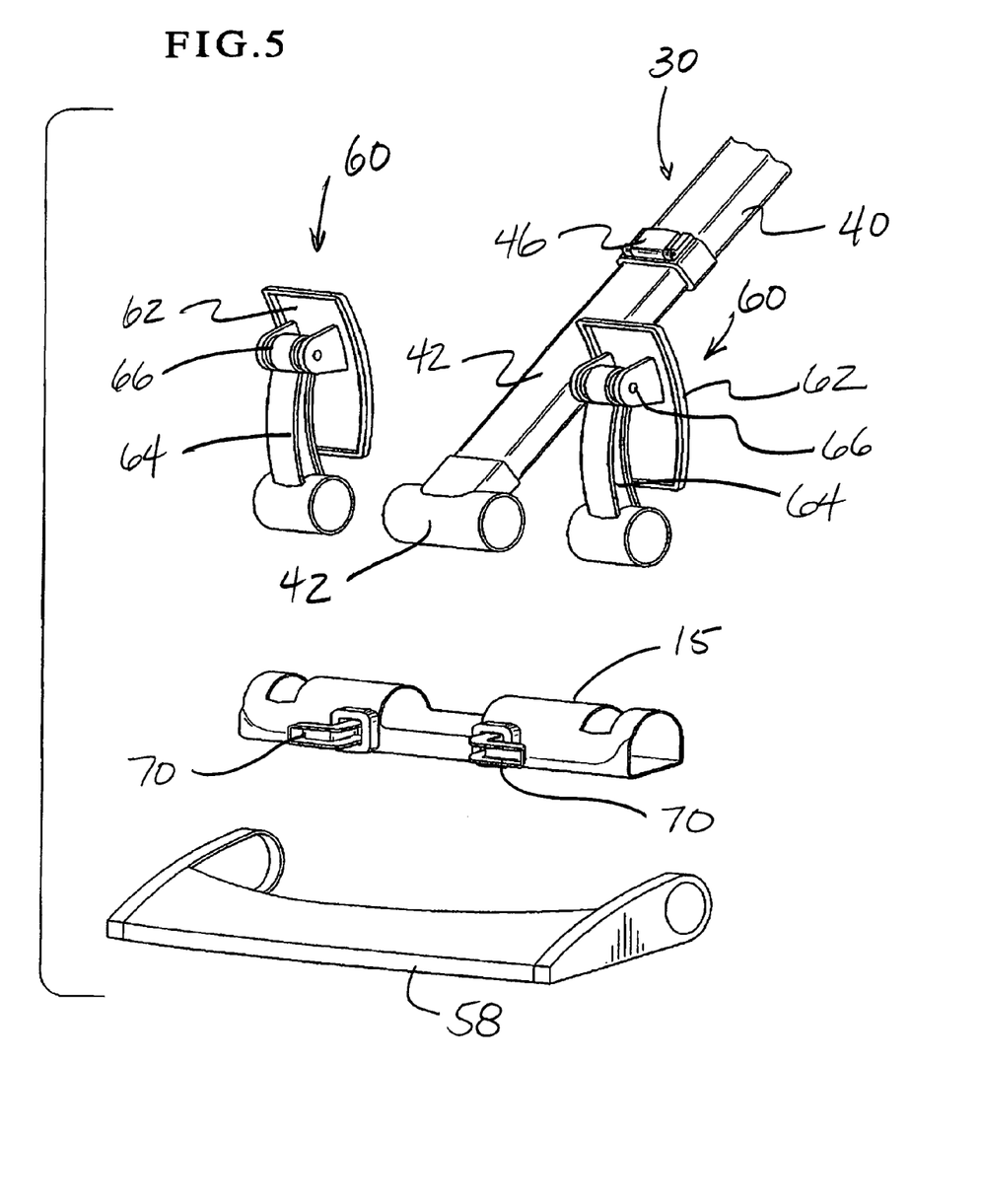
FIG. 5 is an exploded perspective view of the race package of FIG. 1 illustrating the pedals and a portion of the frame of the front portion of the race package.

In one embodiment, the pedal base 16 includes a housing 58 and a base connector 50 which is connected to the housing and defines a receptacle for receiving the end of the second frame support 30. In one embodiment, the second frame support is sized so that the second frame support matingly fits into the receptacle of the base connector 50 in a snap fit or compression fit relationship. It should be appreciated that any suitable connectors such as screws or bolts may be used to secure the base connector 50 to the second frame support 30. The base connector 50 is rotatably connected to the housing 58 to enable the housing 58 to pivot towards and away from the second frame support 30. The housing 58 pivots towards the second frame support 30 to store the transportable apparatus 10 and pivots away from the second frame support 30 when the transportable apparatus is being set up or placed in the operating position.

In one embodiment, at least two pedals 60 are movably connected to the housing 58. A separate housing or cover 15 is connected to the housing 58 to provide protection and to improve the aesthetic appearance of the apparatus. Each pedal includes a foot support 62 which is a generally rectangular or flat surface as illustrated in FIG. 5. It should be appreciated that the foot support 62 may be any suitable size or shape. The foot support 62 is rotatably connected to an arm 64 which is a substantially vertical or upright. An axle or pin is inserted through the foot support 62 and the arm 64 to hold the foot support 62 on the end of the arm 64. The foot support 62 is rotatably or pivotably connected to the arm such that the foot support can be adjusted to accommodate different foot placement preferences of a player. The arm 64 is movably connected within the channel 68 defined by the housing 58. At least one tension spring (not shown) is connected to the bottom of the pedal 60 to bias the pedal towards the seat 12. Accordingly, when a player pushes against the foot support 62, the foot support moves or slides away from the seat 12 within the channel 68. This enables the transportable apparatus 10 to simulate the operation of a pedal of an actual vehicle such as a car. In one embodiment, one of the pedals 60, such as the right pedal, is a gas pedal or accelerator pedal similar to a car. The other pedal 60 is a brake pedal which stops the movement or forward motion of the simulated car. It should be appreciated that the transportable apparatus 10 of the present invention may include any suitable number of pedals as desired by the game manufacturer.

In one embodiment, an electrical connector such as cord 74 is electrically connected to the transportable apparatus 10 and extends from the transportable apparatus 10 to the video game system (not shown) to communicate signals supplied by the steering wheel and/or the pedals to the video game system. The cord or cable 74 may be any suitable cord or cable that will communicate electrical signals from the transportable apparatus 10 to the video game system.

In one embodiment, the housing 58 of the pedal base defines a channel or groove 72 which positions and secures the cord or cable 74 in the middle of the transportable apparatus 10 to the middle of the pedal base. The channel 72 holds the cord 74 in place so the cord does not become tangled or damaged during the step up and operation of the transportable apparatus.

In one embodiment, at least one cord support 70 is connected to the housing 15 of the pedal base. As illustrated in FIG. 5, the pedal base includes two cord supports 70 which are generally L-shaped. It should be appreciated that the cord supports 70 may be any suitable size and shape. In the illustrated embodiment, the cord or cable 74 is wrapped around one cord support and the other cord support until the cord is completely wound around the cord supports 70. This securely stores the cord 74 to the transportable apparatus 10 and prevents damage to the cord when the transportable apparatus is folded or packed up for transport to another location.

In one embodiment, a sensitivity control (not shown) is attached to the position control or steering wheel to enhance the sensitivity of the steering wheel. The sensitivity control adjusts the sensitivity or reaction speed between the movement of the steering wheel and the corresponding movement of the simulated vehicle displayed on the display device or screen connected to the video game system. The sensitivity control enables a player to adjust the sensitivity of the steering wheel to adjust the reaction time or delay between the movement of the steering wheel and the corresponding movement of the simulated vehicle displayed on the screen. The player adjusts the sensitivity control based on their preferences.

It should be appreciated that the above components or parts of the transportable apparatus 10 may be made of stainless steel, plastic, or any suitable material or combination of materials desired by the manufacturer.

As illustrated in FIGS. 2A to 2D, the transportable apparatus 10 is initially shown in an open or operative position. To pack up or fold the transportable apparatus to a storage position for transport to another location, the player removes the steering wheel from the steering wheel connector 48 by moving or sliding the lock lever over to release the steering wheel. The player then pivots or folds the first frame support towards and adjacent to the seat base as illustrated in FIG. 2B until the first frame is adjacent to the seat base. The player then pivots or moves the second frame support downward towards the first frame support as shown in FIG. 2C.

Referring now to FIG. 2C, the second frame support, the first frame support and the seat base are pivoted together towards the rear member or back support. Once the first frame support, second frame support and seat base are positioned against or adjacent to the rear member or back support, the rear support is pivoted about the hinge and over the top of the rear member until the support is adjacent to the seat base which is in its closed position. The support is then secured to the bottom of the seat base using a suitable fastener such as velcro or other suitable connecting device. The transportable apparatus 10 is then folded into a compact and easily transportable carrying pack as illustrated in FIG. 2D. A container or pocket 76 is connected to the back of the rear member or back support to securely hold the steering wheel during transport of the transportable apparatus. It should be appreciated that the steering wheel may be secured to the folded portion of the transportable apparatus using any suitable connector or fastening device. In one embodiment, a handle such as a strap or other carrying member is attached to one end of the transportable apparatus 10 to enable a user to easily carry the folded transportable apparatus to another location.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A transportable apparatus for a video game system comprising:
   a frame;
   a seat having a base and a rear member foldably connected to said frame such that said frame is movable between a storage position adjacent to and between said base and said rear member of said seat and an operative position away from said seat; and
   an interface associated with one of said frame and said seat for providing user input to the video game system, at least a portion of said interface being foldably connected to said frame such that in said storage position said portion of said interface is also adjacent to and between said base and said rear member.

2. The transportable apparatus of claim 1, wherein said seat includes a base and a rear member movably connected to said base, said rear member being movable to several different positions.

3. The transportable apparatus of claim 2, which includes a support hingedly connected to said rear member.

4. The transportable apparatus of claim 2, which includes a support strap positioned between said support and said rear member, said support strap connected to said support and said rear member.

5. The transportable apparatus of claim 1, wherein said interface includes a steering wheel.

6. The transportable apparatus of claim 1, wherein said interface includes a pedal.

7. The transportable apparatus of claim 1, wherein said interface includes a plurality of pedals.

8. The transportable apparatus of claim 7, wherein at least one of the plurality of pedals includes at least one of a acceleration pedal and a brake pedal.

9. The transportable apparatus of claim 1, which includes a communication member adapted to be in communication with said interface.

10. The transportable apparatus of claim 9, wherein said communication member includes at least one electrical cable.

11. The transportable apparatus of claim 9, wherein said communication member includes a wireless communication device.

12. A transportable apparatus for a video game system comprising:
    a first frame member;
    a second frame member hingedly connected to said first frame member, wherein said first frame member and said second frame member are movable between a storage position and an operative position;
    a seat foldably connected to said first frame member, said seat including a base and a rear member hingedly connected to said base, wherein said rear member is movable towards and away from said base to a plurality of different positions;
    a steering wheel removably connected to said first frame member;
    a plurality of pedals each movably connected to said second frame member; and
    a communication device associated with one of said frame and said seat for providing user input to the video game system,
    wherein when the first frame member, the second frame member and the seat are in the operative position, the first frame member and the second frame member are movable to enable a user to move the second frame member towards said first frame member and move said first frame member to a position adjacent to and between said base and said rear member of said seat to place the apparatus in the storage position.

13. The transportable apparatus of claim 12, wherein said first frame member includes at least two telescoping members connected in a sliding relationship, said telescoping members being slidable to a plurality of different positions.

14. The transportable apparatus of claim 13, which includes a lock attached to at least one of said telescoping members to hold said telescoping members in a desired position.

15. The transportable apparatus of claim 12, wherein said second frame member includes at least two telescoping members connected in a sliding relationship, said telescoping members being slidable to a plurality of different positions.

16. The transportable apparatus of claim 15, which includes a lock attached to at least one of said telescoping members to hold said telescoping members in a desired position.

17. The transportable apparatus of claim 12, which includes a support hingedly connected to said rear member.

18. The transportable apparatus of claim 17, which includes a support strap positioned between said support and said rear member, said support strap connected to said support and said rear member.

19. The transportable apparatus of claim 12, wherein said steering wheel includes at least one input device.

20. The transportable apparatus of claim 12, wherein said plurality of pedals includes a gas pedal and a brake pedal.

21. The transportable apparatus of claim 12, wherein said communication device includes at least one electrical cable.

22. The transportable apparatus of claim 12, wherein said communication device includes a wireless communication device.

23. The transportable apparatus of claim 12, which includes a container attached to said seat, said container sized to receive said steering wheel.

24. A transportable apparatus for a video game system comprising:

- a frame including a first member and a second member hingedly connected to said first member;
- a seat foldably connected to said frame, said seat including a base and a rear member hingedly connected to said base, said rear member being movable to a plurality of different positions;
- a container attached to said seat;
- a support hingedly connected to said rear member;
- a steering wheel removably connected to said frame;
- at least one pedal movably connected to said frame; and
- a connector connected to said frame and in communication with said steering wheel and said pedal,
- wherein said steering wheel is removed and placed in said container, said second member is moved to a position adjacent to said first member, said first member is moved to a position adjacent to said base, said first member, second member and base are moved to a position adjacent to said rear member and said support is moved about said seat to a position adjacent to said second member such that said rear member and said support enclose said first member, said second member and said base.

25. The transportable apparatus of claim 24, which includes a handle connected to at least one of said rear member and said support.

26. A method for storing and transporting an apparatus for a video game system to different locations, wherein the transportable apparatus includes a frame having a first member and a second member hingedly connected to the first member, a seat foldably connected to the frame, the seat including a base and a rear member hingedly connected to the base, a container attached to the seat, a support hingedly connected to the rear member, a steering wheel removably connected to the frame, at least one pedal movably connected to the frame and a connector connected to the frame and in communication with the steering wheel and the pedal, the method comprising the steps of:

- (a) removing the steering wheel;
- (b) placing the steering wheel in the container;
- (c) moving the second member to a position adjacent to the first member;
- (d) moving the first member to a position adjacent to the base of the seat;
- (e) moving the first member, second member and base to a position adjacent to the rear member of the seat;
- (f) moving the support about the seat to a position adjacent to the second member so that the rear member and the support enclose the first member, the second member and the base;
- (g) transporting the apparatus to a different location;
- (h) moving the support, the base, the first member and the second member each to a desired operative position;
- (i) removing the steering wheel from the container; and
- (j) connecting the steering wheel to the first member.

27. The method of claim 26, wherein transporting the apparatus includes carrying the apparatus using at least one handle connected to at least one of the frame and the seat.

* * * * *